US012375574B2

(12) United States Patent
Cazenave et al.

(10) Patent No.: US 12,375,574 B2
(45) Date of Patent: Jul. 29, 2025

(54) FUNNEL VISUALIZATION OF USER JOURNEYS IN A WEBSITE

(71) Applicant: Content Square SAS, Paris (FR)

(72) Inventors: Lucile Cazenave, Cenon (FR); Vincent Cavaillé-Coll, Paris (FR); Gonzalo Aguirre, Girona (ES); Valentin Buisson, Annecy (FR); Ilyes Houdjedje, Sens (FR); Sravani Vobilisetty, Paris (FR); Ozgur Sezer, Montrouge (FR); Alexandre Rousseau, Genas (FR); Pooja Patwardhan, Montigny-le-Bretonneux (FR); Eslam Ahmed, Villeurbanne (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/372,757

(22) Filed: Sep. 26, 2023

(65) Prior Publication Data

US 2024/0106910 A1   Mar. 28, 2024

Related U.S. Application Data

(60) Provisional application No. 63/410,019, filed on Sep. 26, 2022.

(51) Int. Cl.
*G06F 15/173* (2006.01)
*H04L 67/14* (2022.01)
*H04L 67/50* (2022.01)

(52) U.S. Cl.
CPC ............ *H04L 67/535* (2022.05); *H04L 67/14* (2013.01)

(58) Field of Classification Search
CPC .............................. H04L 67/535; H04L 67/14
USPC .................................. 709/224, 223, 203, 217
See application file for complete search history.

(56) References Cited

U.S. PATENT DOCUMENTS

| | | | |
|---|---|---|---|
| 6,982,708 B1 | 1/2006 | Mah et al. | |
| 11,144,185 B1* | 10/2021 | Dinga | G06F 16/248 |
| 11,502,923 B1* | 11/2022 | Kumar | G06F 16/986 |
| 11,582,316 B1* | 2/2023 | Danyi | H04L 67/52 |
| 2010/0095208 A1* | 4/2010 | White | H04L 67/535 |
| | | | 715/704 |

(Continued)

OTHER PUBLICATIONS

"International Application Serial No. PCT/IB2023/059498, International Search Report mailed Nov. 3, 2023", 3 pgs.

(Continued)

*Primary Examiner* — Kaylee J Huang
(74) *Attorney, Agent, or Firm* — Schwegman Lundberg & Woessner, P.A.

(57) ABSTRACT

Method of generating a funnel interface starts with a processor receiving, from client devices, user activity data associated with interactions by users with a website displayed on the client devices. The website comprises webpages displayed during sessions. The processor receives from a user associated with a display device a plurality of steps of a funnel. Each of the steps comprising one or more of the plurality of webpages. The processor causes a funnel interface to be displayed on the display device. The funnel interface includes a visualization of at least one of a plurality of metrics associated each of the plurality of steps based on the user activity data. The metrics include a completion rate, a conversion rate, a drop off rate, or any combination thereof. Other embodiments described herein.

20 Claims, 12 Drawing Sheets

(56) References Cited

U.S. PATENT DOCUMENTS

| | | | |
|---|---|---|---|
| 2012/0084437 A1* | 4/2012 | Wenig | H04L 67/14 |
| | | | 709/224 |
| 2012/0240064 A1* | 9/2012 | Ramsay | G06T 11/00 |
| | | | 715/762 |
| 2015/0363051 A1* | 12/2015 | Yao | G06Q 30/02 |
| | | | 715/739 |
| 2016/0062558 A1* | 3/2016 | Delacroix | G06F 16/2264 |
| | | | 715/835 |
| 2018/0060089 A1* | 3/2018 | Hunigan | G06F 16/9577 |
| 2019/0266621 A1 | 8/2019 | Eckman et al. | |
| 2019/0320065 A1* | 10/2019 | Valentine | H04L 67/535 |
| 2020/0380016 A1* | 12/2020 | Pradjinata | H04L 67/535 |
| 2022/0035888 A1 | 2/2022 | Diaz et al. | |
| 2022/0131769 A1* | 4/2022 | Dille | G06F 11/3409 |

OTHER PUBLICATIONS

"International Application Serial No. PCT/IB2023/059498, Written Opinion mailed Nov. 3, 2023", 5 pgs.

* cited by examiner

FUNNEL VISUALIZATION OF USER JOURNEYS IN A WEBSITE

BACKGROUND

Electronic commerce (e-commerce) facilitates trillions of dollars in transactions yearly. Using their personal electronic devices, users can quickly and easily access a business' website or mobile application to purchase goods or services directly from the business.

It is imperative to understand the online customers' digital behaviors and gather insights therefrom. For example, the digital behaviors can include the navigational patterns of the user to the website or within the website as well as interactions with the elements displayed on the website. Improving the online customers' digital experience on the website will directly lead to increased sales and revenue growth from website or mobile application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

To understand the online customers' digital behaviors, the online customer's digital interactions on the webpage needs to be tracked and analyzed. It is important for the client to be able to see how the visitors progress through the client's website or mobile application, page-by-page, from entry onto the website to the exit (e.g., in a session). Among other things, embodiments of the present disclosure improve the functionality of digital experience tracking systems by generating a funnel interface that provides granular details on the visitors' behavior through specific journeys through the website or mobile application. The website can be displayed on an electronic device (e.g., laptop, desktop) or on a mobile application of a mobile device or smart phone, for example. Moreover, embodiments of the present disclosure allow the users to define the steps or paths of the specific journeys that they wish to analyze and obtain granular information including conversion metrics and/or completion metrics (e.g., conversion or completion rates, drop off rates, etc.). By providing these metrics and a visual representation of the visitor's journey through a specified funnel of user specified steps, a business can quickly identify the specific funnels that allow for the most completions or conversions as well as the specific funnels that cause the most friction or frustration or drop offs. The business can further identify and address the specific step within a funnel that is causing the most friction or frustration leading to the high rate of drop offs in order to avoid this loss of revenue to the business.

Networked Computing Environment

Figure 1:
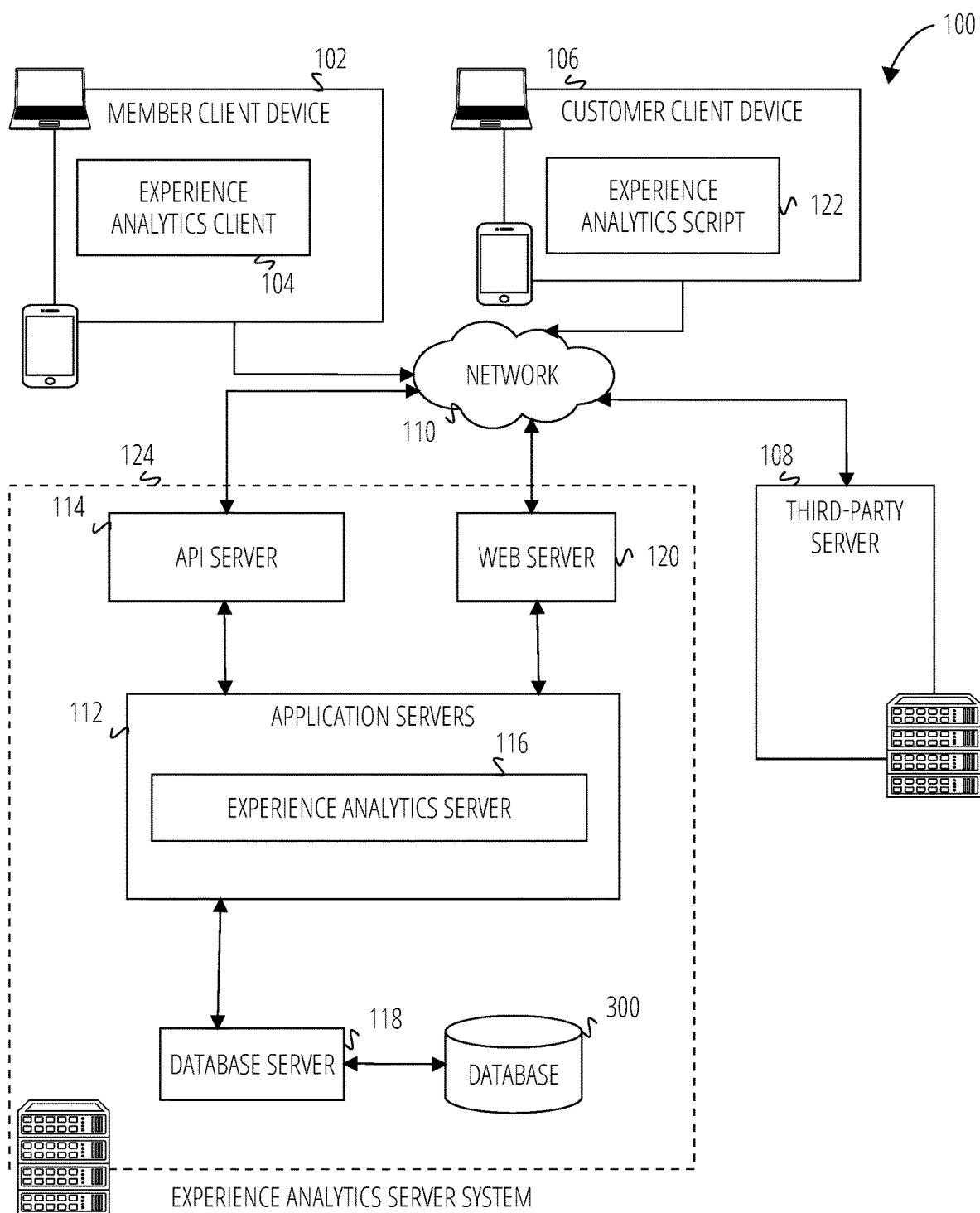
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, feedback provided by the user into feedback forms or widgets on the website, etc. Other processor and memory intensive processing of data may also be performed server-side by the experience analytics server 116, in view of the hardware requirements for such processing.

System Architecture

Figure 2:
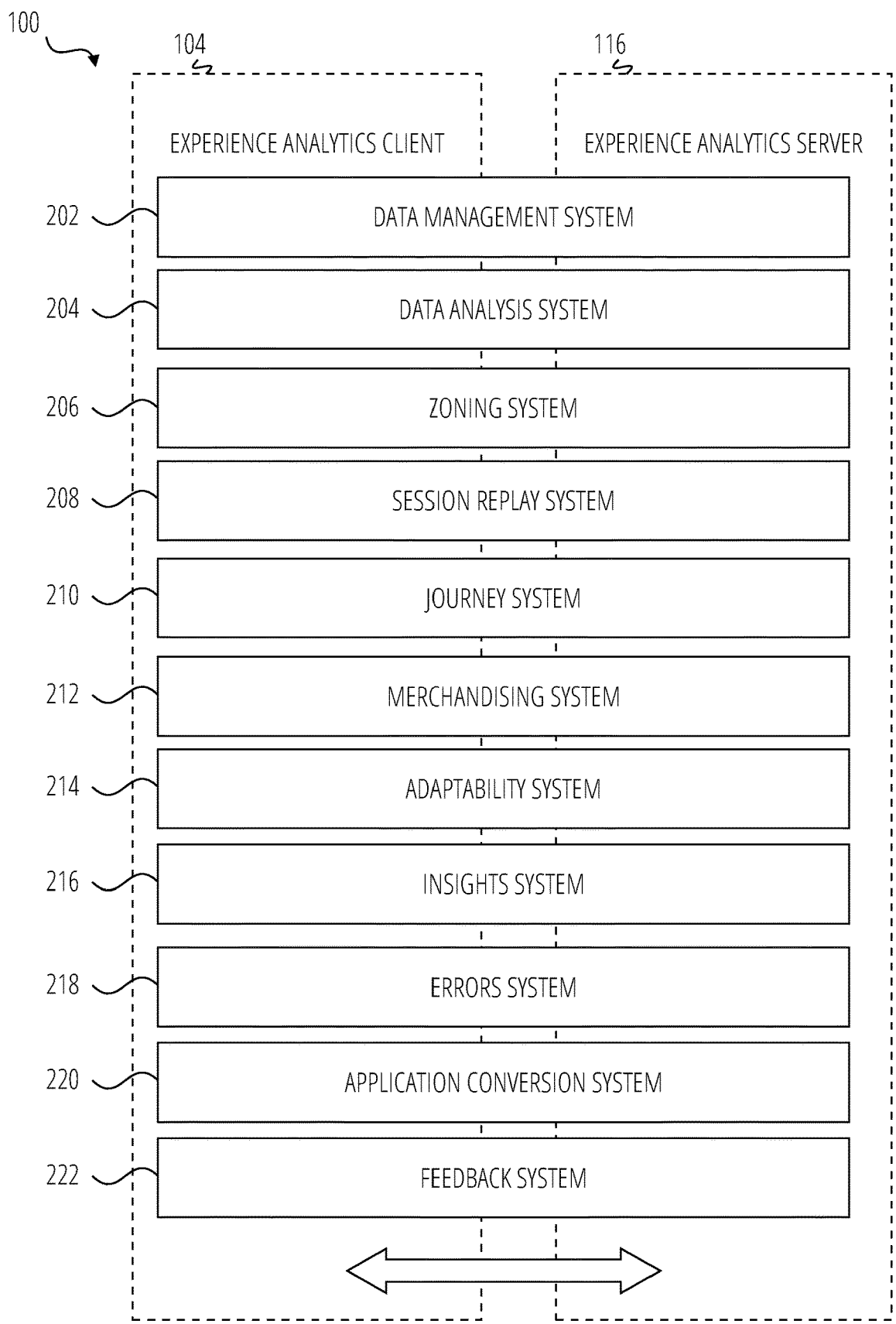
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website or mobile application, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The journey system 210 is further responsible for generating a funnel interface to be displayed by the member client device 102 via the experience analytics client 104. The funnel interface allows for a more granular analysis of each journey in the journey interface. The funnel interface can allow a user to define a plurality of steps of a funnel to be completed by a visitor to the website or mobile application. Each of the steps can be defined as a page or a group of pages. The funnel interface includes a visualization of how the visitors progress through the steps as, for example, a percentage of visitors who have moved from one step to the next step (e.g., achieved completion of the step) and a percentage of visitors who have dropped off at that step (e.g., drop off).

The journey system 210 can also be responsible for generating a path interface to be displayed by the member client device 102 via the experience analytics client 104. The path interface allows for another granular analysis of each journey in the journey interface.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for visitors that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 104.

Data Architecture

Figure 3:
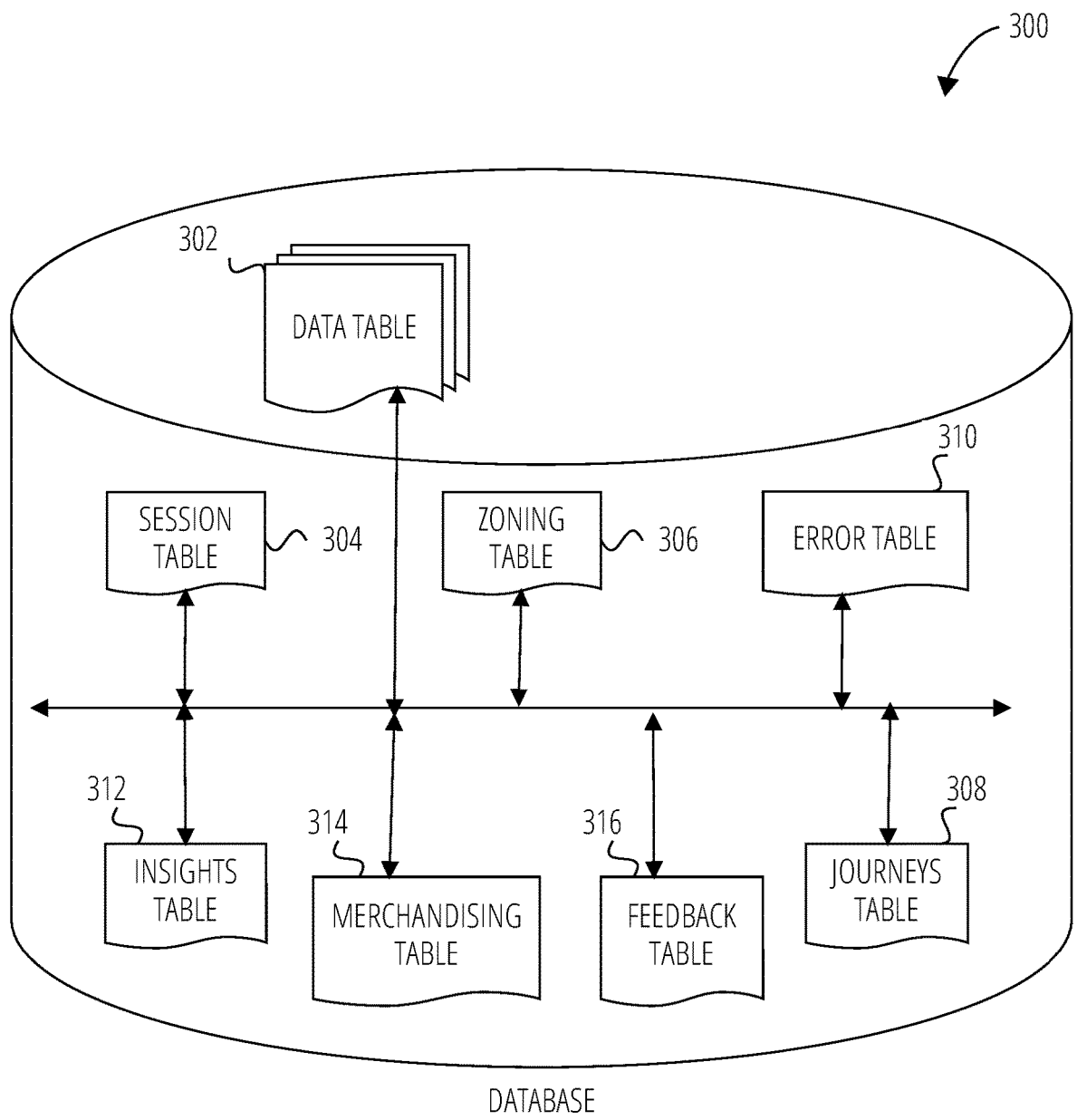
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 106 and stored in association with the customer client device 106 and the website associated with the customer client device 106. The feedback data can include, for example, the text input that provides the visitor's (or customer's) feedback on the website, survey response, rating that includes an image, an emoticon, or an icon, a screenshot of one of the plurality of webpages, etc.

Process of Generating Funnel Interface

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
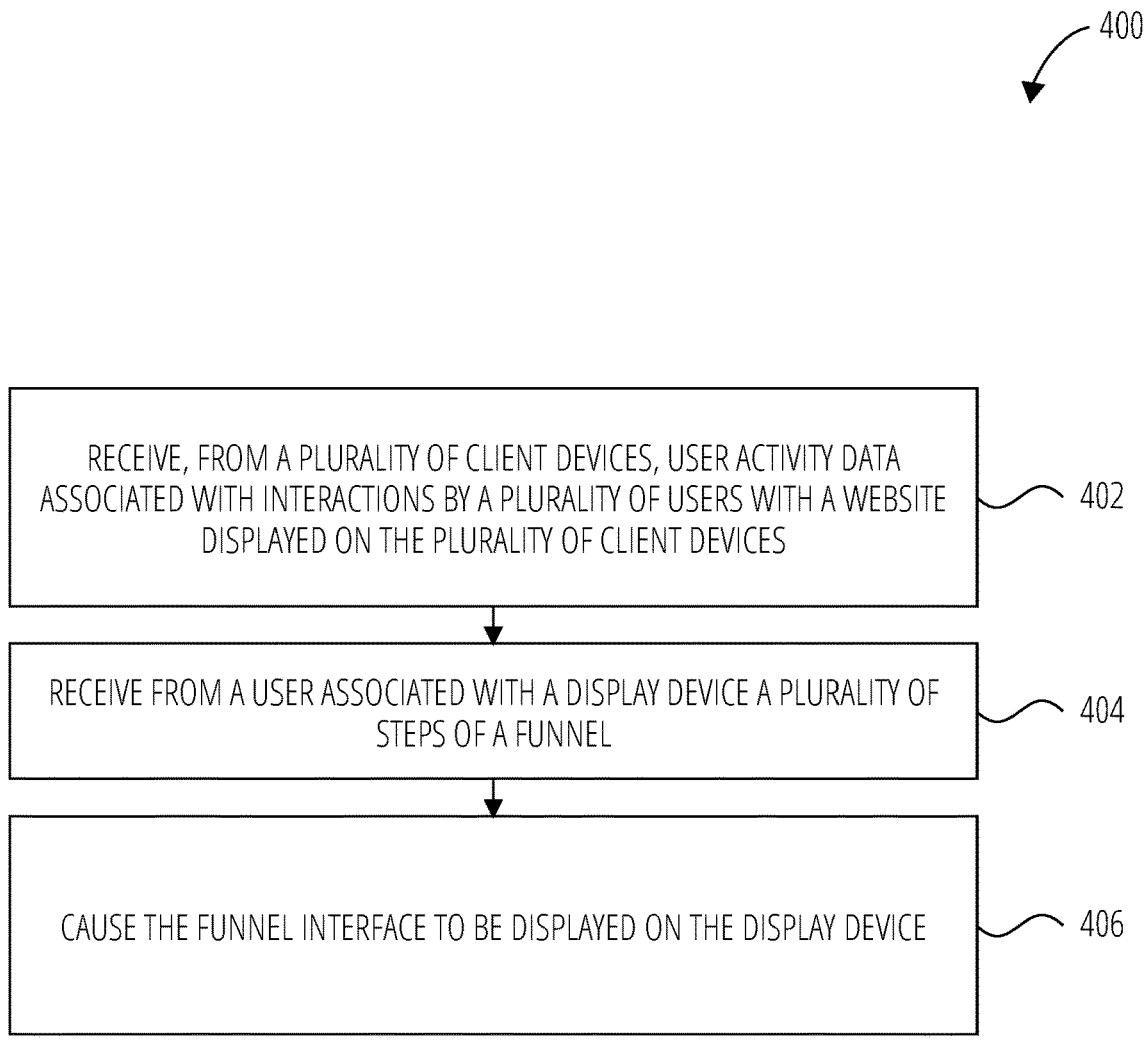
FIG. 4 illustrates a process 400 to generate a funnel interface in accordance with one embodiment.

FIG. 4 illustrates a process 400 to generate a funnel interface in accordance with one embodiment. The process 400 can be performed by a processor included in the journey system 210, in any system in the experience analytics system 100, or any combination thereof.

The process 400 starts, at operation 402, with a processor receiving from a plurality of client devices user activity data associated with interactions by a plurality of users with a website or mobile application displayed on the plurality of client devices. For example, the user activity data comprises changes in an interface of the website or mobile application displayed on the plurality of client devices, elements on the website or mobile application displayed or visible on the interface displayed on the plurality of client devices, text inputs by the users into the website or mobile application displayed on the plurality of client devices, a movement of cursor of a mouse, touchpad or touch screen, a click or activation of the mouse, the touchpad or the touch screen on the interface of the website or mobile application, or any combination thereof.

The website or mobile application can comprise a plurality of webpages displayed during a plurality of sessions. Each of the plurality of sessions comprises a timeframe between an entry by a user of the plurality of users into the website or mobile application and an exit by the user from the website or mobile application. For example, a session can start when a user enters a website or mobile application and can end when the user exits the website or mobile application.

Figure 5A:
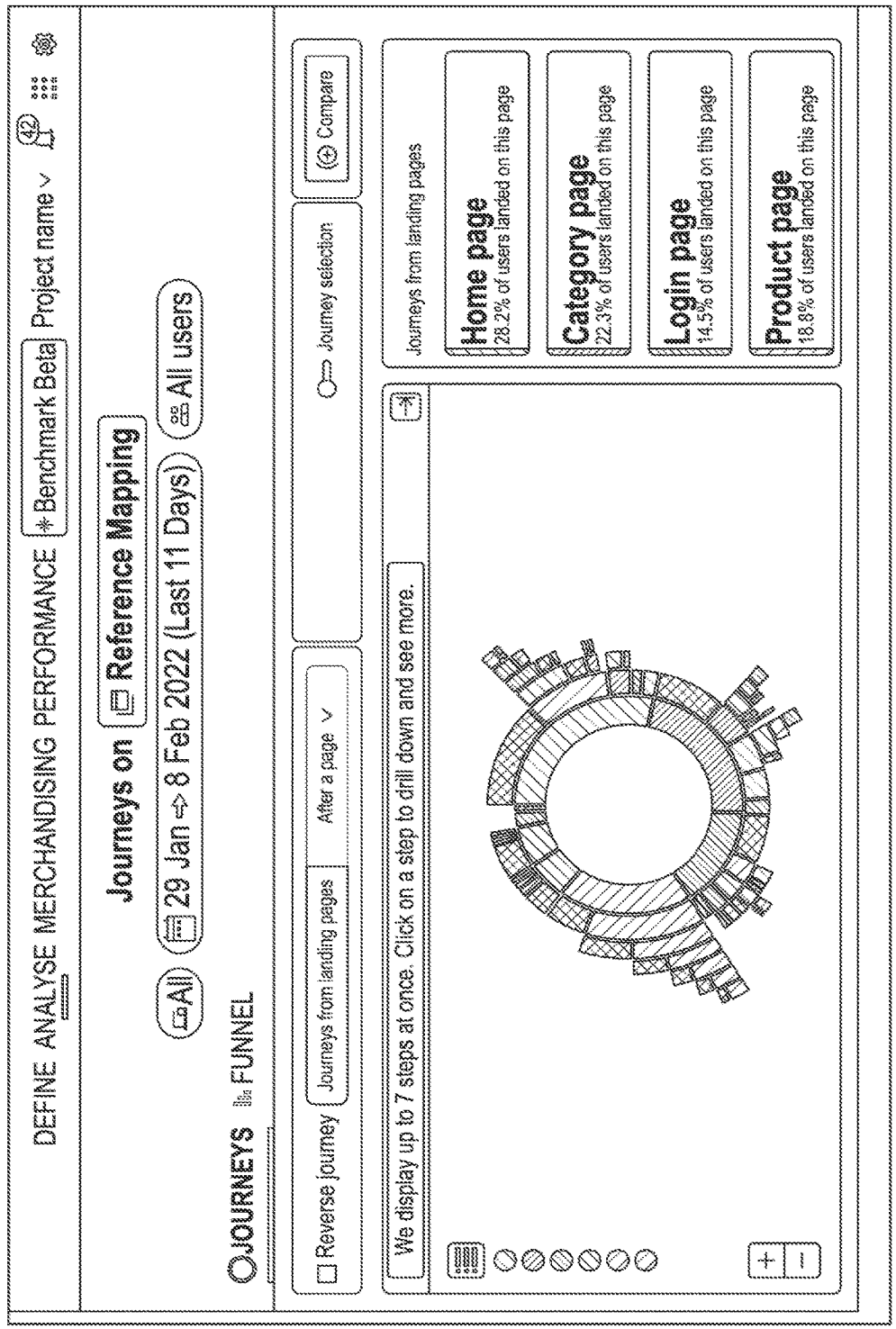
FIG. 5A-5F illustrate interfaces in accordance with some examples.

At operation 404, the processor receives from a user associated with a display device a plurality of steps of a funnel. Each of the plurality of steps comprising one or more of the plurality of webpages. In one example, the user selects via the plurality of steps from a sunburst visualization displayed on a journey interface. In this example, the processor can cause a journey interface to be displayed on the display device. For example, in FIG. 5A, the journey interface comprises an illustration of journeys, page-by-page, by users associated with client devices through the website during the plurality of sessions. The journey by users through the website, as shown in FIG. 5A, can start at the centermost ring in the sunburst visualization. For example, the most common start pages in the example in FIG. 5A are the homepage, category page and log-in page. The user's progress through the website is illustrated in the sunburst visualization has a step to the next outward ring in the sunburst. At a quick glance, the sunburst visualization illustrates the different paths or journeys, page-by-page, through the website. In this example, the user reviewing the sunburst visualization can select a number of segments from the centermost ring of the sunburst visualization to the outside ring to select the steps of the funnel.

Figure 5B:
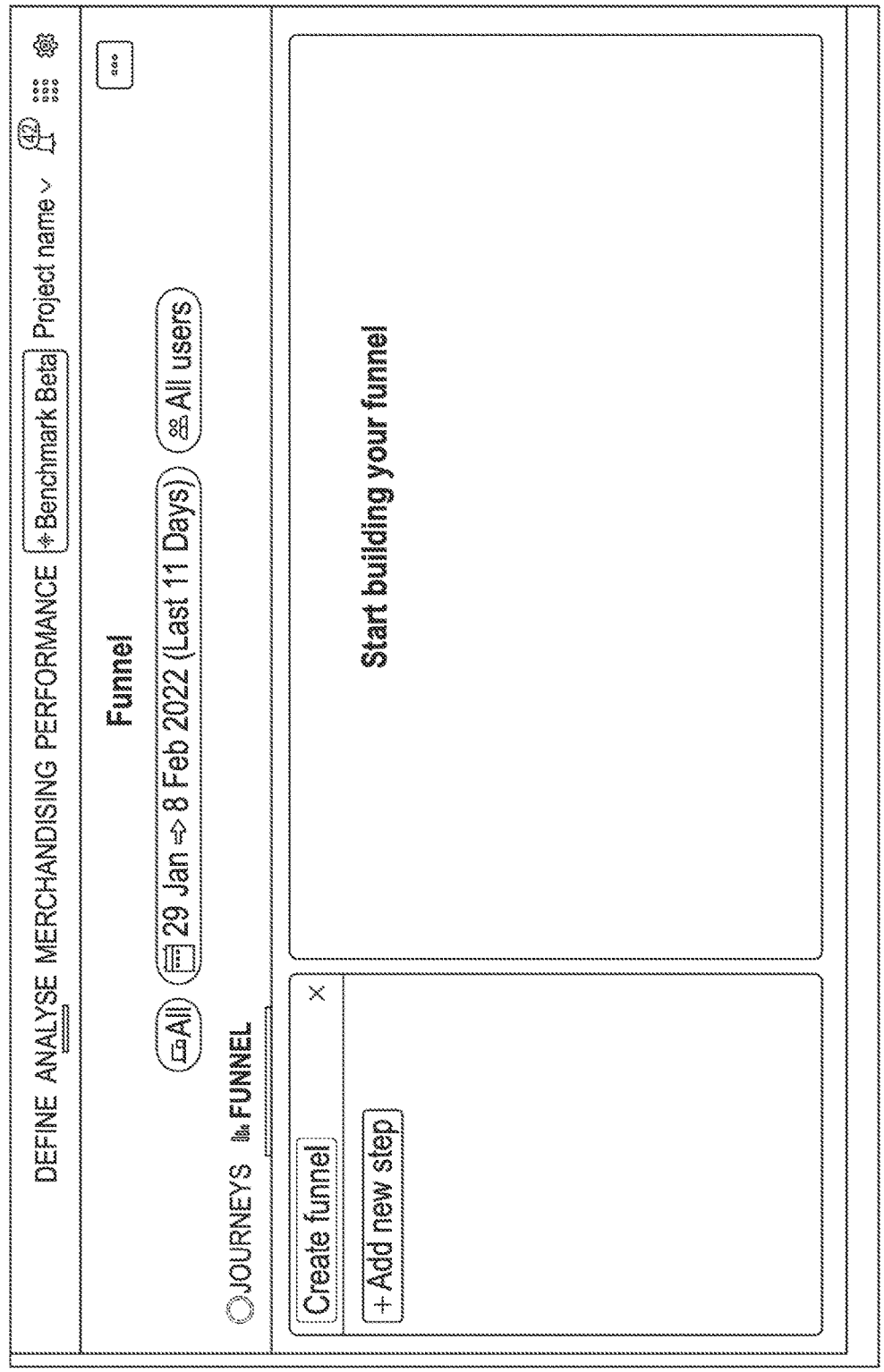
Figure 5C:
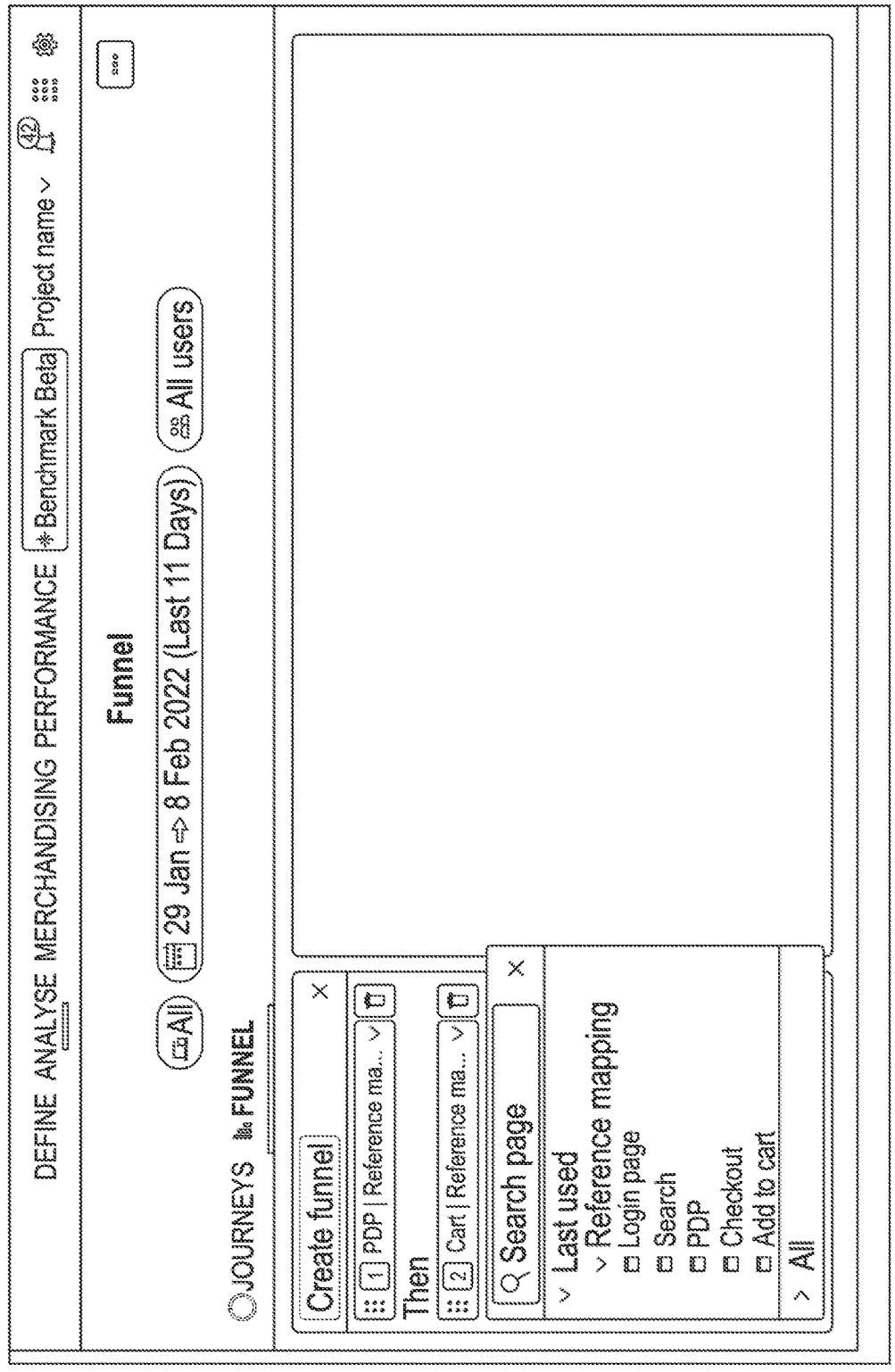
Figure 5D:
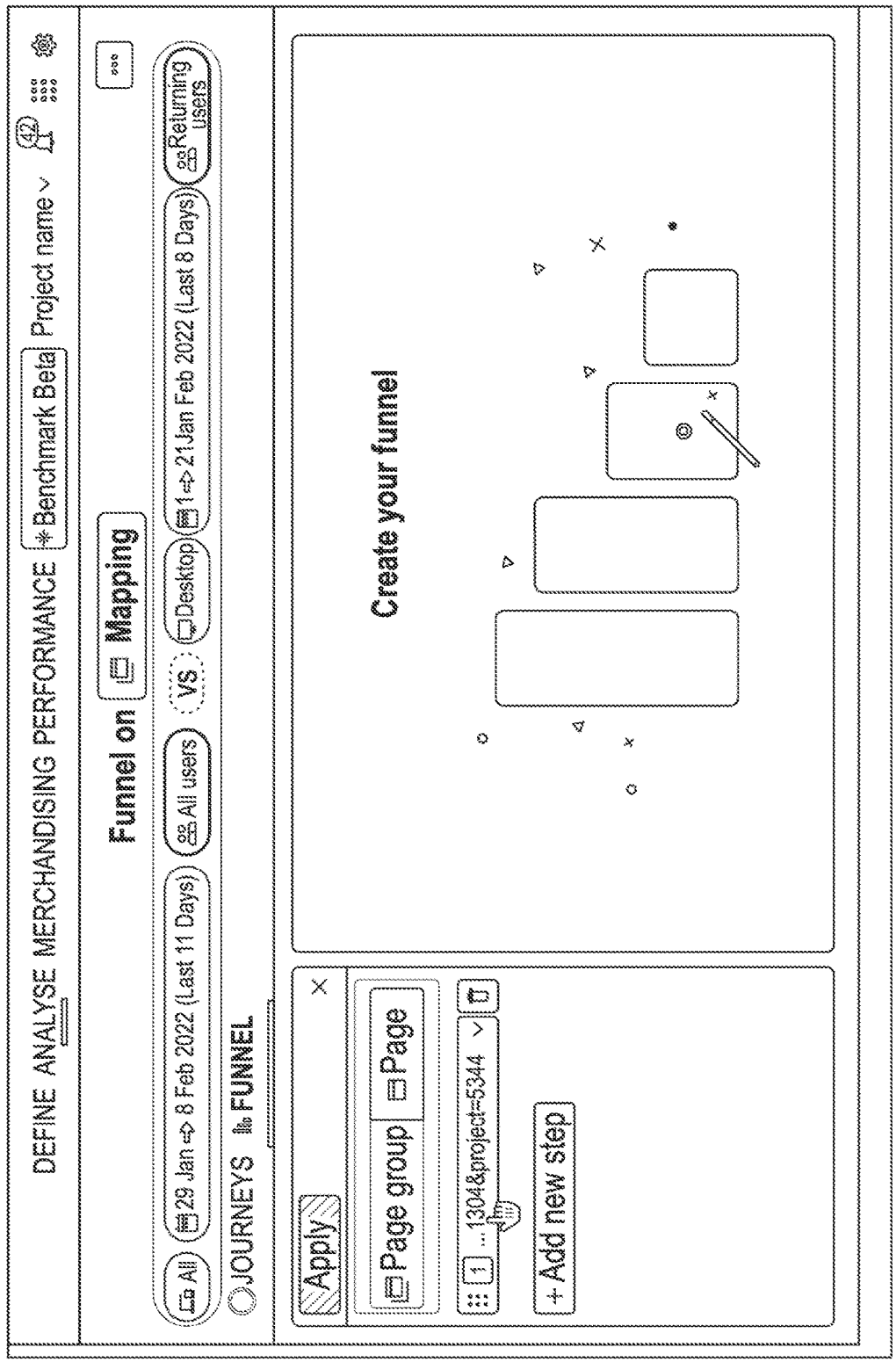

In another example, as shown in FIG. 5B-FIG. 5D, the user selects the plurality of steps by entering a webpage (e.g., a specific URL address) or a group of webpages (e.g., product pages, search pages, etc.) for each of the steps. For example, the input indicating the webpage comprises a specific URL address and the input indicating the group of webpages comprises an identification of a group of product pages, a group of search pages, a group of payment pages, or any combination thereof. The group of webpages can be previously mapped by the user in the experience analytics server system 124.

At operation 406, the processor causes the funnel interface to be displayed on the display device. The display device can be a member client device 102. The funnel interface can include a visualization of at least one of a plurality of metrics associated each of the plurality of steps based on the user activity data. The metrics includes a completion rate, a conversion rate, a drop off rate, or any combination thereof.

Figure 5E:
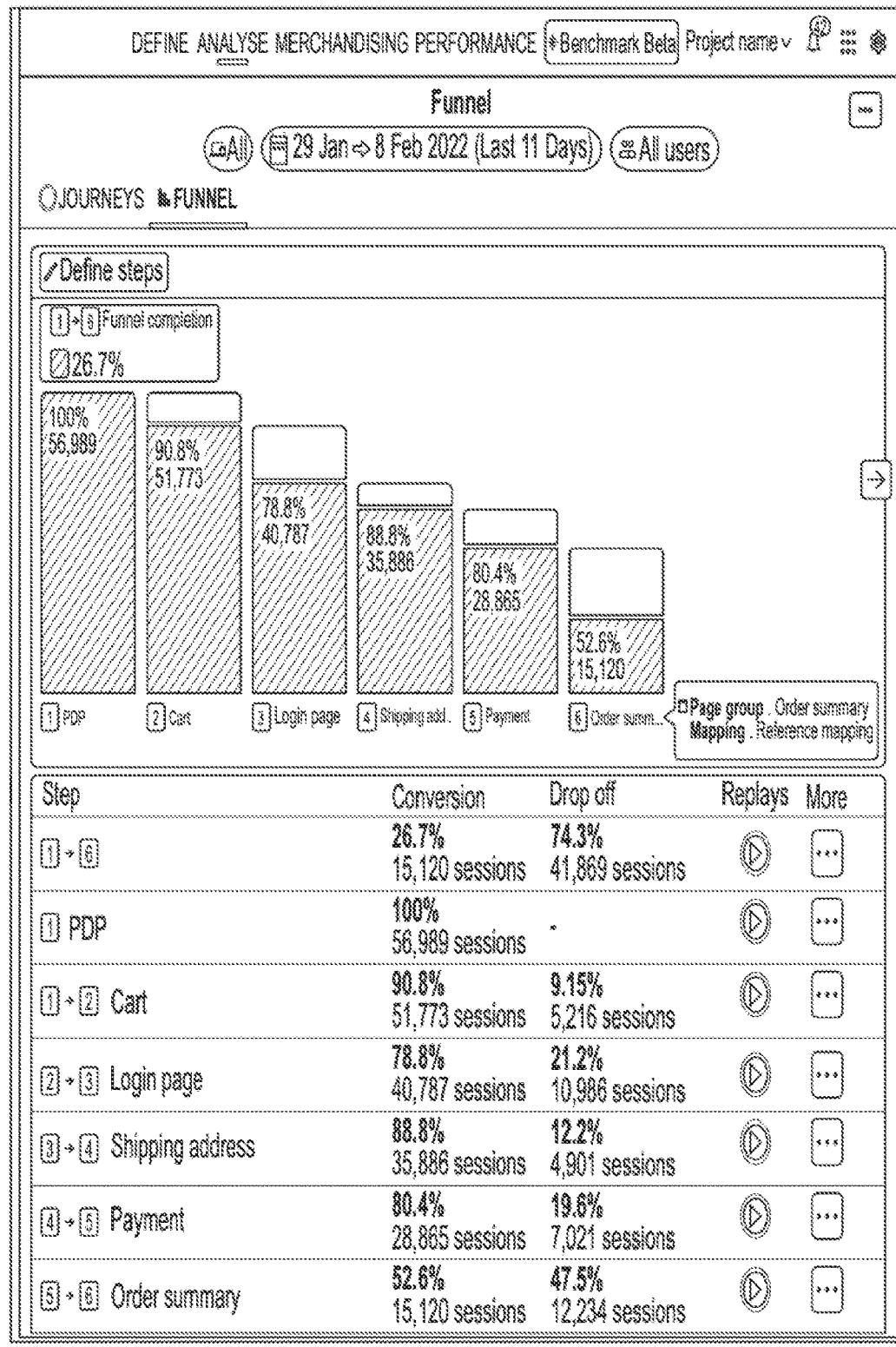

For example, out of a total number of visitors to the website or mobile application (e.g., users of the customer client devices 106), the completion rate can be a number of the total visitors or percentage of the total visitors that completed a given step. As shown in FIG. 5E, the first bar of the bar graph illustrates that 100% of the visitors (e.g., users of customer client devices 106) to the PDP page includes 56,989 visitors and the second bar of the bar graph illustrates that only 90.8% or 51,773 visitors reached the cart page from the PDP page. Accordingly, the completion rate from the first step (e.g., PDP page) to the second step (e.g., cart page) is 90.8% or 51,773 visitors.

Moreover, the completion rate can be defined with respect to the number of sessions completing the steps of the funnel or with respect to the number of users (e.g., users of the customer client device 106) completing the steps of the funnel. The users of the customer client devices 106 can each be defined by a cookie when the users are browsing the website on a web browser on the customer client device 106. The experience analytics server 116 can generate a user identification to define each of the users of the customer client devices 106 that are viewing websites via mobile applications on the customer client device 106.

The conversion rate can be the number of visitors or percentage of visitors of the total number of visitors that completed all of the steps defined by the user to be a conversion. For example, for a non e-commerce client, conversion can be defined as a completion of each of the steps required to submit a sign-up for an account on the website. In this example, each of the steps in the funnel can be the different pages in sequence to complete a sign-up for an account. Upon clicking the submit button of the sign-up, each of the steps of the funnel are completed and this visitor is associated with a successful conversion.

For an e-commerce client, the conversion can be defined as completing each of the steps required to complete a purchase of an item. As shown in FIG. 5E, the sixth step in the funnel is the order summary page. Accordingly, the visitors that have reached and viewed the order summary page are associated with a successful conversion. In FIG. 5E, the conversion rate can be, for example, the number of visitors of the total number of visitors that have reached the order summary page that is 15,120 visitors or the percentage that is 15,120/56,989.

The drop-off rate can be a number of visitors or a percentage of visitors who have exited the website from a given page. For example, as shown in FIG. 5E, the first bar of the bar graph illustrates that 100% of the visitors to the PDP page includes 56,989 visitors and the second bar of the bar graph illustrates that only 90.8% or 51,773 visitors reached the cart page from the PDP page. Accordingly, the drop-off rate from the first step (e.g., PDP page) to the second step (e.g., cart page) is 9.2% or 5216 visitors (e.g., 56,989-51,773).

In one example, the overall drop-off rate can include both user drop-offs and user exits from the website or mobile application by users of customer client device 106. The user drop-offs include users who did not proceed to the next expected step in the funnel but did continue navigating on the website or mobile application. User exits include users who left the website or mobile application from a given step.

FIG. 5A illustrates an interface 502 in accordance with one example. The interface 502 can be a journey interface that is generated by the journey system 210 to be displayed by the member client device 102 via the experience analytics client 104. The journey interface 502 illustrates how the visitors progress through the client's website, page-by-page, from entry onto the website to the exit (e.g., in a session). In one example, the journey interface 502 illustrates how the visitors progress through the client's website or mobile application with respect to page groups that are defined by the user of the member client device 102 or by experience analytics server 116. For example, a page group can be a product page as illustrated in FIG. 5A, which includes an aggregation of a plurality of pages related to products being sold on the website or mobile application. In another example, a page group can be a homepage as illustrated in FIG. 5A which may have been defined to only include one page on the website or mobile application.

The journey interface can include a visualization that provides a customer journey mapping (e.g., sunburst visualization). As shown in FIG. 5A, the sunburst visualization illustrates a sequence of page groups. This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

In one example, using the sunburst visualization, the user can select a portion of the sunburst corresponding to a funnel of steps to be further detailed in a funnel interface. The funnel selected can include for example a journey during a session that starts from the homepage, to a product page, to a checkout page, to a confirmation page, and to an exit from the website. In another example, the funnel that is selected can also start and end at any point in a session (e.g., starting at a product page and ending at a checkout page).

While the sunburst visualization provides a view of steps through the website directly from page-to-page (e.g., "directly then" condition), the funnel displays a view of the steps through the website that occurred from one page to another page (e.g., "then" condition) but not necessarily directly from page to page. For example, the sunburst visualization shows the three separate visitors having navigated from page 1, 2, 3, and 4; pages 1, 3, and 4; and 1, 2, and 4, respectively, whereas the funnel visualization having defined step 1 as page 1 and step 2 as page 4 can show as a bar graph all three of the visitors in the sunburst having completed step 2. All the visitors where at page 1 and reached page 4 even if they had taken different paths through the website.

FIG. 5B illustrates an interface 504 in accordance with one example. The interface 504 can be a funnel creation interface 504 that is caused to be displayed when the user activates the funnel tab that is a selectable item in the journey interface 502. As shown in interface 502, interface 504, interface 506, interface 508, interface 510, and interface 512, the journey tab that causes the journey interface 502 to be displayed and the funnel tab that causes the funnel interface (e.g., interfaces 504, 506, 508, 510, or 512) to be displayed are included therein to allow for the user to switch between the journey and funnel interfaces.

In one example, rather than selecting the portion of the sunburst in FIG. 5A to define the steps of the funnel to be analyzed, the user can define each of the steps via the funnel creation interface 504. In the funnel creation interface 504, a selectable item (e.g., labeled "add new step") that can be selected by the user to define each of the plurality of steps in a funnel.

Once the user selects the selectable item labeled "add new step" in funnel creation interface 504, the funnel creation interface 506 in FIG. 5C can be caused to be displayed which allows the user to further define the group of webpages (e.g., product pages, search pages, etc.) for each of the steps. For example, in funnel creation interface 506, the first step of the funnel is the PDP (product detail page) group of pages and the second step is the cart group of pages. The group of webpages can be previously mapped by the user in the experience analytics server system 124.

In another embodiment, once the user selects the selectable item labeled "add new step" in funnel creation interface 504, the funnel creation interface 508 in FIG. 5D can be caused to be displayed which allows the user to select the page entry option (e.g., via the selectable item labeled "page") and define the plurality of steps by entering a webpage (e.g., a specific URL address) for each of the steps.

The funnel creation interface 508 also includes a selectable item for the page group option (e.g., selectable item labeled "page group" which allows the user to define the plurality of steps by selecting a group of webpages (e.g., product pages, search pages, etc.) for each of the steps similar to the funnel creation interface 506 in FIG. 5C.

As shown at the top of funnel creation interface 508, the user is also able to enter one or more segments of visitors to the website to analyze (e.g., all users on all devices within the last 11 days vs. returning users on desktop devices within the last 8 days, etc.). The segments can be defined by characteristics of the users (e.g., new users, all users, returning users, etc.), time frame to be analyzed (e.g., a specified date range), the type of devices associated with the visitors (e.g., all devices, mobile devices, desktop devices, etc.) or any combination thereof.

FIG. 5E illustrates a funnel interface 510 in accordance with one example. Once the user defines the steps in a funnel to be analyzed, the funnel interface 510 provides a visualization of at least one of a plurality of metrics associated with each of the plurality of steps based on the user activity data. The metrics includes a completion rate, a conversion rate, a drop off rate, or any combination thereof.

The funnel in funnel interface 510 includes steps 1 to 6 which includes: (1) PDP, (2) Cart, (3) Login page, (4) Shipping address, (5) Payment, and (6) Order summary. The visualization in funnel interface 510 includes a bar graph that illustrates the percentage of visitors having completed a step and the percentage of visitors who have not (e.g., drop off). For example, 90.8% of visitors reached the Cart page in step 2 from the PDP page in step 1. That is a 90.8% completion rate for the step 2. The bar graph further illustrates that, of the 51,773 visitors who have reached step 2, 40,787 visitors completed step 3, which is a 78.8% completion rate. Above the bar graph, the funnel completion rate from step 1 to 6 is shown to be 26.7% (e.g., 15,120 visitors that completed step 6 divided by the 56,989 visitors in step 1).

In the bottom portion of the funnel interface 510, the metrics (e.g., the conversion or completion percentage, the number of visitors converting or completing, the drop off percentage, the number of visitors that drop off, etc.) are further provided in detail for each of the steps. Moreover, at each step of the funnel, a selectable item is provided (e.g., a play button) that when selected can cause visualization of a different session associated with visitors to the website that performed the given step of the funnel. For example, the third row is associated with the steps 1 (e.g., PDP page) and 2 (e.g., cart page). Selecting the selectable item (e.g., the play button on the third row) causes the visualization of a portion of the users' sessions where the user navigated from the PDP page to the cart page. The visualization can be a replay of the activities performed by the user on the website that resembles a playback of a recording of the user's interactions with the website.

While not shown, the funnel interface 510 can further include frustration scores and insights to each of the steps. The frustration score is a score that indicates the frustration level experienced by the visitors with each of the steps. The frustration scores can be provided for each of the webpages included in the funnel. Frustration scores can also be generated for the visitors' sessions on the webpage as well as an overall frustration score associated with the business' website as a whole. In one example, based on the analysis of the user activity data, the insights system 216 can generate insights for the steps in the funnel to be displayed in the funnel interface 510. For example, the insights system 216 can detect a rage click in step 2 or a looping behavior in step 3 which may be contributing to the visitors' dropping off at these steps. In this example, the rage click insight can be included as an insight displayed with respect to step 2 in interface 510 and the looping behavior can be included as an insight displayed with respect to step 3 in interface 510.

Figure 5F:
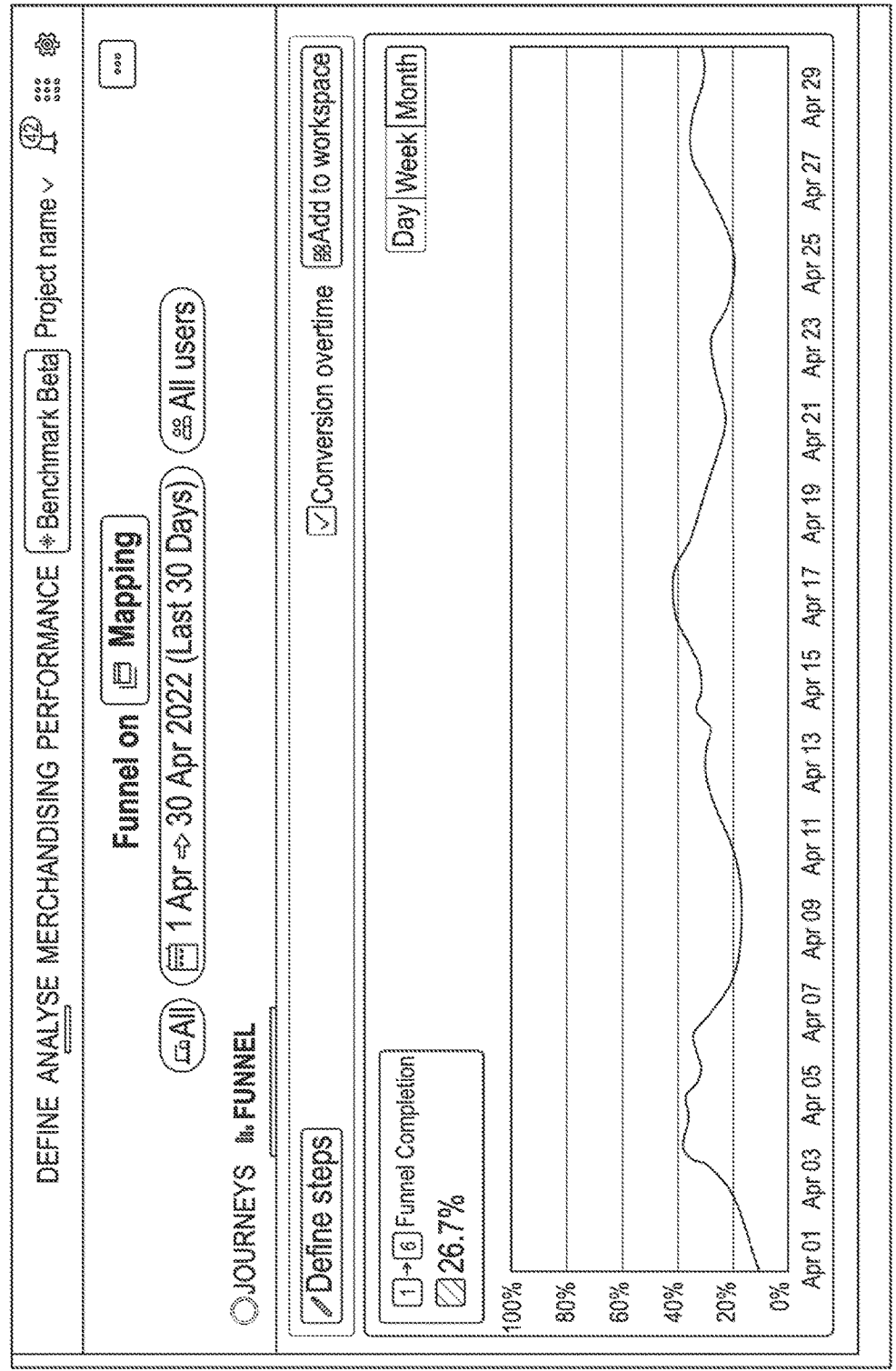

FIG. 5F illustrates an interface 512 in accordance with one example. The funnel interface 512 can also include a graph of the completion rate (or percentage) of the funnel over time. As shown in interface 512, the funnel completion rate can be provided for a month, a week, a day, or any specified period of time.

While not shown, a graph of other metrics over time can be included in the interface 512. For example, a graph of the conversion rate or the drop off rate of the funnel over time can be generated and displayed in the interface 512. Further, instead of metrics associated with the whole funnel, the metrics for any of the steps can also be used. In one example, the completion rate, the conversion rate or the drop off rate of a specific step can be illustrated over time in interface 512.

In another example, a plurality of metrics can be included in the interface 512 to provide a comparative view of the metrics. In one example, the metrics for a plurality of segments can be illustrated over time for a comparative view (e.g., conversion rates for all users vs conversion rates for returning users).

While not shown, the interfaces 502, 504, 506, 508, 510, and 512 can include a path tab in addition to the journey and funnel tabs. The path tab causes a path interface to be displayed on the display device. The path interface provides the details of the user activity on the webpage that occurred between two steps in the funnel.

The funnel displays a view of the steps through the website that occurred from one page to another page (e.g., "then" condition) but not necessarily directly from page to page. In the example where there are three separate visitors having navigated from page 1, 2, 3, and 4; pages 1, 3, and 4; and 1, 2, and 4, respectively, the funnel visualization having defined step 1 as page 1 and step 2 as page 4 can show as a bar graph all three of the visitors having completed step 2. In other words, all the visitors were at page 1 and reached page 4 even if they had taken different paths through the web site. The path interface can include a visualization of the different paths that were taken by the three visitors in this example.

Machine Architecture

Figure 6:
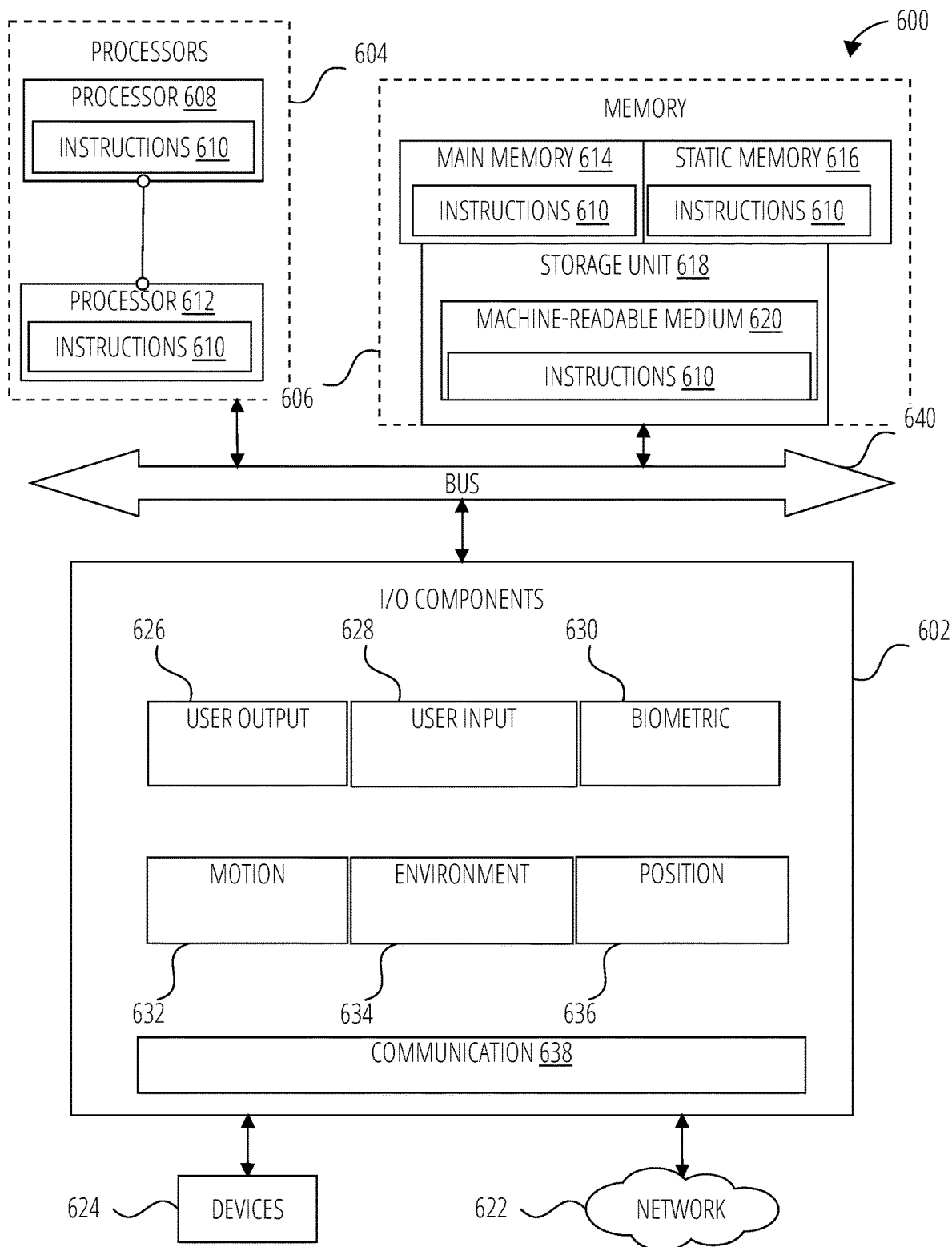
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an application, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the member client device 102 or any one of a number of server devices forming part of the experience analytics server 116. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
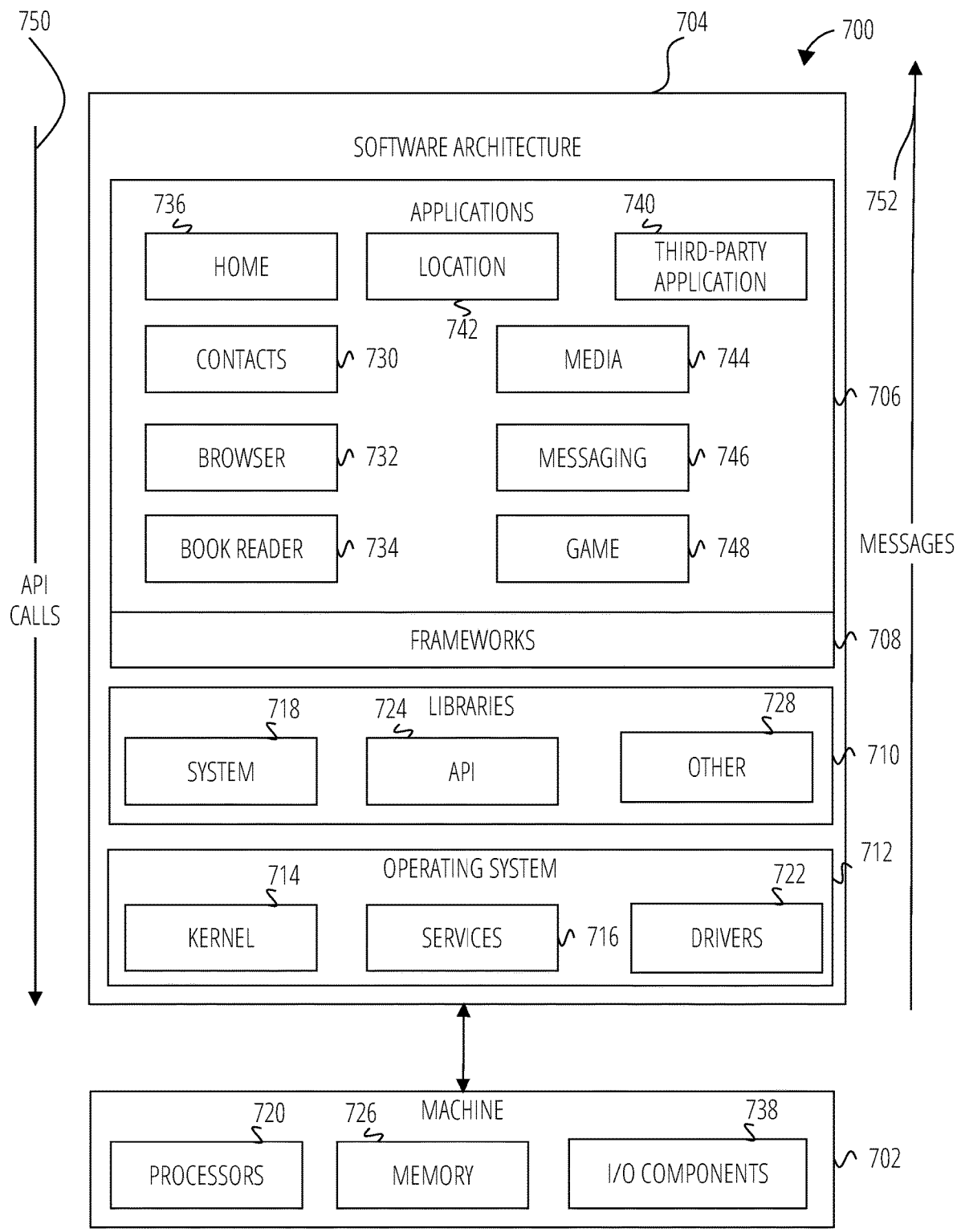
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving, by a processor from a plurality of client devices, user activity data associated with interactions by a plurality of users with a website displayed on the plurality of client devices, wherein the website comprises a plurality of webpages displayed during a plurality of sessions;
   receiving, from a client user associated with a display device, a plurality of steps of a funnel to be completed by the plurality of users through the website, each of the plurality of steps being different and comprising one or more of the plurality of webpages of the website; and
   causing a funnel interface to be displayed on the display device, wherein the funnel interface includes a visualization of a metric associated with each of the plurality of steps based on the user activity data, a plurality of playback selectable items associated with the plurality of steps, and a graph of the metric over a period of time defined by dates, wherein each of the plurality of playback selectable items is configured to cause display of a replay of activities performed by one of the plurality of users on the website associated with each of the plurality of steps.

2. The method of claim 1, wherein the user activity data comprises changes in an interface of the website displayed on the plurality of client devices, elements on the website displayed or visible on the interface of the website displayed on the plurality of client devices, text inputs by the plurality of users into the website displayed on the plurality of client devices, a movement of cursor of a mouse, touchpad or touch screen, a click or activation of the mouse, the touchpad or the touch screen on the interface of the website, or any combination thereof.

3. The method of claim 1, wherein each of the plurality of sessions comprises a timeframe between an entry by a user of the plurality of users into the website and an exit by the user of the plurality of users from the website.

4. The method of claim 1, further comprising:
   causing a journey interface to be displayed on the display device, wherein the journey interface comprises an illustration of journeys, page-by-page, by the plurality of users associated with the plurality of client devices through the website during the plurality of sessions.

5. The method of claim 4, wherein the journey interface comprises a sunburst visualization that provides the illustration of the journeys, wherein each element in the sunburst visualization is associated with one of the plurality of webpages of the website.

6. The method of claim 5, wherein receiving from the client user the plurality of steps comprises:
   receiving from the client user a selection of a subset of elements in the sunburst visualization, wherein the subset of elements in the sunburst visualization includes the plurality of steps.

7. The method of claim 1, wherein receiving from the client user the plurality of steps comprises:
   receiving from the client user an input indicating the one or more of the plurality of webpages of the website, wherein the input indicates a webpage or a group of webpages for each of the plurality of steps.

8. The method of claim 7, wherein the input indicating the webpage comprises a specific Uniform Resource Locator (URL) address.

9. The method of claim 7, wherein the input indicating the group of webpages comprises an identification of a group of product pages, a group of search pages, a group of payment pages, or any combination thereof.

10. The method of claim 1, wherein the visualization of the metric comprises a bar graph that illustrates the metric, wherein the metric comprises a completion rate, a drop off rate, or any combination thereof.

11. A system comprising:
    a processor; and
    a memory storing instructions that, when executed by the processor, cause the system to perform operations comprising:
    receiving from a plurality of client devices, user activity data associated with interactions by a plurality of users with a website displayed on the plurality of client devices, wherein the website comprises a plurality of webpages displayed during a plurality of sessions;
    receiving, from a client user associated with a display device, a plurality of steps of a funnel to be completed by the plurality of users through the website, each of the plurality of steps being different and comprising one or more of the plurality of webpages of the website; and
    causing a funnel interface to be displayed on the display device, wherein the funnel interface includes a visualization of a metric associated with each of the plurality of steps based on the user activity data, a plurality of playback selectable items associated with the plurality of steps, and a graph of the metric over a period of time defined by dates, wherein each of the plurality of playback selectable items is configured to cause display of a replay of activities performed by one of the plurality of users on the website associated with each of the plurality of steps.

12. The system of claim 11, wherein each of the plurality of sessions comprises a timeframe between an entry by a user of the plurality of users into the website and an exit by the user of the plurality of users from the website.

13. The system of claim 11, the system to perform operations further comprising:
   causing a journey interface to be displayed on the display device, wherein the journey interface comprises an illustration of journeys, page-by-page, by the plurality of users associated with the plurality of client devices through the website during the plurality of sessions.

14. The system of claim 13, wherein the journey interface comprises a sunburst visualization that provides the illustration of the journeys, wherein each element in the sunburst visualization is associated with one of the plurality of webpages of the website.

15. The system of claim 14, wherein receiving from the client user the plurality of steps comprises:
   receiving from the client user a selection of a subset of elements in the sunburst visualization, wherein the subset of elements in the sunburst visualization includes the plurality of steps.

16. The system of claim 11, wherein receiving from the client user the plurality of steps comprises:
   receiving from the client user an input indicating the one or more of the plurality of webpages of the website, wherein the input indicates a webpage or a group of webpages for each of the plurality of steps.

17. The system of claim 16, wherein the input indicating the webpage comprises a specific Uniform Resource Locator (URL) address.

18. The system of claim 16, wherein the input indicating the group of webpages comprises an identification of a group of product pages, a group of search pages, a group of payment pages, or any combination thereof.

19. The system of claim 11, wherein the visualization of the metric comprises a bar graph that illustrates the metric, wherein the metric comprises a completion rate, a drop off rate, or any combination thereof.

20. A non-transitory computer-readable storage medium including instructions that when executed by a processor, cause the processor to perform operations comprising:
   receiving, from a plurality of client devices, user activity data associated with interactions by a plurality of users with a website displayed on the plurality of client devices, wherein the website comprises a plurality of webpages displayed during a plurality of sessions;
   receiving, from a client user associated with a display device, a plurality of steps of a funnel to be completed by the plurality of users through the website, each of the plurality of steps being different and comprising one or more of the plurality of webpages of the website; and
   causing a funnel interface to be displayed on the display device, wherein the funnel interface includes a visualization of a metric associated with each of the plurality of steps based on the user activity data, a plurality of playback selectable items associated with the plurality of steps, and a graph of the metric over a period of time defined by dates, wherein each of the plurality of playback selectable items is configured to cause display of a replay of activities performed by one of the plurality of users on the website associated with each of the plurality of steps.

* * * * *

UNITED STATES PATENT AND TRADEMARK OFFICE
CERTIFICATE OF CORRECTION

| | | |
|---|---|---|
| PATENT NO. | : 12,375,574 B2 | Page 1 of 1 |
| APPLICATION NO. | : 18/372757 | |
| DATED | : July 29, 2025 | |
| INVENTOR(S) | : Cazenave et al. | |

It is certified that error appears in the above-identified patent and that said Letters Patent is hereby corrected as shown below:

On the Title Page

In item (72), in "Inventors", in Column 1, Line 2, delete "Paris" and insert --Lieusaint-- therefor In the Specification In Column 14, Line 42, delete "I/O" and insert --(I/O)-- therefor In Column 14, Line 64, delete "606," and insert --614,-- therefor Signed and Sealed this
Tenth Day of February, 2026

John A. Squires
*Director of the United States Patent and Trademark Office*